United States Patent
Teggatz et al.

(10) Patent No.: US 7,827,334 B2
(45) Date of Patent: Nov. 2, 2010

(54) PROTOCOL METHOD APPARATUS AND SYSTEM FOR THE INTERCONNECTION OF ELECTRONIC SYSTEMS

(75) Inventors: Ross E. Teggatz, McKinney, TX (US); Wayne T. Chen, Plano, TX (US)

(73) Assignee: Triune IP LLC, Richardson, TX (US)

( * ) Notice: Subject to any disclaimer, the term of this patent is extended or adjusted under 35 U.S.C. 154(b) by 104 days.

(21) Appl. No.: 12/146,474

(22) Filed: Jun. 26, 2008

(65) Prior Publication Data

US 2009/0327543 A1 Dec. 31, 2009

(51) Int. Cl.
- *G06F 13/42* (2006.01)
- *G06F 15/173* (2006.01)
- *G06F 15/00* (2006.01)
- *G06F 1/32* (2006.01)

(52) U.S. Cl. .......................... 710/105; 709/223; 712/32; 713/320

(58) Field of Classification Search ................. 710/105; 713/320; 709/223; 712/32
See application file for complete search history.

(56) References Cited

U.S. PATENT DOCUMENTS

| | | | | |
|---|---|---|---|---|
| 4,878,058 | A * | 10/1989 | Needles | 341/101 |
| 6,535,522 | B1 * | 3/2003 | Arato et al. | 370/466 |
| 6,708,207 | B1 * | 3/2004 | Sabelhaus et al. | 709/223 |
| 7,376,147 | B2 * | 5/2008 | Seto et al. | 370/465 |
| 7,412,588 | B2 * | 8/2008 | Georgiou et al. | 712/33 |
| 2003/0067930 | A1 * | 4/2003 | Salapura et al. | 370/412 |
| 2006/0004935 | A1 * | 1/2006 | Seto et al. | 710/62 |
| 2006/0288246 | A1 * | 12/2006 | Huynh | 713/320 |
| 2007/0005862 | A1 * | 1/2007 | Seto | 710/300 |
| 2007/0233916 | A1 * | 10/2007 | Seto | 710/100 |
| 2009/0037641 | A1 * | 2/2009 | Bresniker | 711/100 |
| 2009/0070505 | A1 * | 3/2009 | Krueger et al. | 710/107 |

* cited by examiner

*Primary Examiner*—Mark Rinehart
*Assistant Examiner*—Christopher A Daley
(74) *Attorney, Agent, or Firm*—Konczal Law Firm PLLC

(57) ABSTRACT

Disclosed are methods, apparatus, and systems for the interconnection of electronic system apparatus having one or more different communication protocols. A preferred embodiment is disclosed in which a single physical interface and a single protocol are used for providing an efficient and scalable interconnection between a host and operably coupled subsystem apparatus connected to the MMC. In a disclosed method, a bus is provided for coupling a system host to a plurality of system components and a Multi-Management Protocol (MMP) is employed. The Multi-Management Protocol includes a plurality of subclasses, each further including component identity information and function data. The subclasses are grouped by functionality into at least two groups comprising a standard group and an extension group. In a multi-component electronic system according to the invention, an electronic protocol packet structure includes a starting frame delimiter, a length field, a target address field, a subclass identifier, an operation identifier, a data field, and a frame check field. Disclosed preferred embodiments also include protocol conversion apparatus having a Multi-Management Controller (MMC) using a host bus for transmitting and receiving data between a host and the MMC based on a Multi-Management Protocol (MMP).

16 Claims, 3 Drawing Sheets

PROTOCOL METHOD APPARATUS AND SYSTEM FOR THE INTERCONNECTION OF ELECTRONIC SYSTEMS

TECHNICAL FIELD

The invention relates to the interconnection among the apparatus of electronic systems for working in concert. More particularly, the invention relates to methods, apparatus, and systems for the interconnection of electronic system apparatus having one or more different communication protocols.

BACKGROUND OF THE INVENTION

There are known mechanisms used for coordinating and synchronizing mutual connections among electronic system apparatus for sharing data and resources. Communications protocols are sets of standard data formats and language constructs for device identification and data representation among electronic systems. Communications protocols may be generally characterized as either low-level protocols or high-level protocols. Low-level protocols such as RS-232, $I^2C$, SMBus, and PMBus, for example, provide relatively streamlined means for communicating a relatively limited quantity of information such as physical interface characteristics, signal characteristics, circuit parameters, state information, and error reporting. Low-level protocols are typically used in simple low-cost electronics that require basic communications such as "smart" batteries, power supplies and handheld instruments. Low-level protocols are optimized towards low-cost systems that have simple hardware logic and/or a small micro-controller. Due to their simplicity and limitations, such protocols require additional processing and/or hardware resources in order to support different types of system applications, tending to increase the complexity of the host system. This limits the efficiency of software resources on the host and their potential for reuse.

High-level protocols have been developed to support complex applications such as personal computers, telecommunications and network infrastructure. High-level protocols, for example TCP/IP (Transmission Control Protocol/Internet Protocol), have many different facilities built into the protocol such as sequencing, addressing and versioning that can support complex applications. Such protocols require sophisticated processing resources, such as 32-bit micro-processors, external memory subsystems, and media framers, to accommodate the operation of the protocol. Along with a great deal of flexibility and scalability, high-level protocols also bring a demand for significant hardware resources in order to support the protocol. This is due not only to the large size of a high-level protocol, but also due to the necessary algorithms and processing required to implement each of several included protocol layers. In a typical layered high-level protocol, each layer has an assigned function, receiving services from the layer below, and performing services for the layer above. For example, a lower layer may perform data delivery, while another layer immediately above performs connection management. Each individual layer is relatively simple, since it performs only one specific function. The overall high-level protocol architecture however, may include many layers and may be very complex.

It is also known in the arts to use protocol tunneling schemes in which one protocol, usually a low-level protocol, is carried as data, or encapsulated, within another protocol, usually of a higher level. Accordingly, such a protocol tunneling system requires that the high-level system be endowed with the capability of using both the high-level "tunnel" protocol, and the low-level "tunneled" protocol. Thus, protocol tunneling may be used to combine otherwise incompatible system components, but as currently practiced in the art, nevertheless requires the inclusion of all relevant protocols within the host system.

The present invention is directed to overcoming, or at least reducing, problems present in the prior art, and contributes one or more heretofore unforeseen advantages to the art, such as providing improved integration of multi-component systems using different protocols, simplified interoperability, and reduced system development costs while providing backward-compatibility to prior art systems.

SUMMARY OF THE INVENTION

Increasingly, there is a need to coordinate among various electronic system and subsystem apparatus having various levels of sophistication and complexity. A system may include a personal computer, for example, coupled with peripheral subsystems having various communications, power, and data requirements, such as printers, telecommunications devices, or remote sensors, for example. In general, low-level protocols are not scalable enough in terms of performance and capabilities to readily meet the needs of more sophisticated applications without adding additional hardware and software complexity. Conversely, the greater level of functionality and flexibility that high-level protocols can support often requires processing, memory, and power resources that cannot be readily implemented in low-level subsystem apparatus.

Experience, observation, analysis, and careful study of challenges and problems related to the configuration and management of multi-component electronic systems have led the inventors to identify and address the need for efficient and scalable protocol methods and systems for coordinating the operation of multi-component electronic systems. Responsive to this need, the inventors have developed protocol methodologies and the associated Multi-Management Protocol (MMP) and Multi-Management Controller (MMC) described herein. In carrying out the principles of the present invention in accordance with preferred embodiments, the invention preferably uses a single physical interface and a single protocol, MMP, for providing an efficient and scalable interconnection between a host and subsystem hardware connected to the MMC. The MMP provides the host with the ability to work with numerous communications protocols, providing a scalable protocol for interconnecting and managing multiple system components. The MMP is designed to provide a layering and subclassing approach useful for grouping system components according to protocol messages and functionality. The MMP also includes support for more advanced features such as dynamic subsystem apparatus detection, relieving the host of some of the processing burden associated with maintaining connections among the apparatus of a multi-component system. The MMC acts as a conversion device providing the necessary logic hardware for mapping between a single communication bus coupled with a host, and multiple subsystem apparatus requiring equal or lower-level protocols.

The invention has advantages including but not limited to one or more of the following: relieving the host of the bulk of the burden of ensuring protocol compatibility among system apparatus; reducing instances of unused compatibility options; reducing instances of redundant functionality; increasing system efficiency; increasing scalability; enhancing the ability to independently update system apparatus; and, reducing costs. These and other features, advantages, and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

While the making and using of various exemplary embodiments of the invention are discussed herein, it should be appreciated that the present invention provides inventive concepts which can be embodied in a wide variety of specific contexts. It should be understood that the invention may be practiced with high-level and low-level communication protocols, components, systems, and processes of various types and in various applications without altering the principles of the invention. For purposes of clarity, detailed descriptions of functions and systems familiar to those skilled in the pertinent arts are not included.

Figure 1:
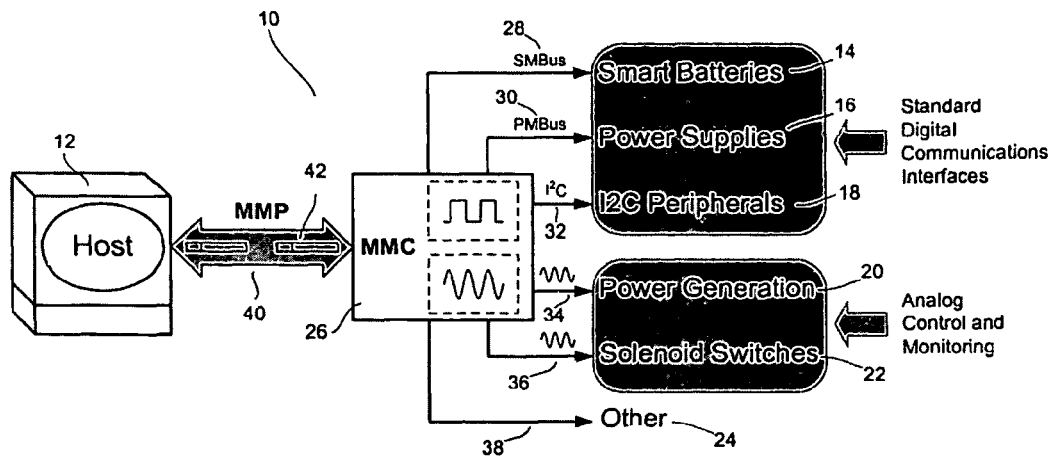
FIG. 1 is a schematic diagram of an example of a preferred embodiment of a system of the invention.

In general, the invention provides a scalable communications protocol for simple and complex system configuration and operational management. In the description of the invention, the term Multi-Management Protocol (MMP) is used to refer to the protocol, and the term Multi-Management Controller (MMC) is used to refer to the hardware, or combination of hardware and software, used to implement the MMP within a broader system. The MMP architecture is structured to provide simplified layering and application classification that can be implemented using modest processing resources in electronic systems. FIG. 1 shows a simplified diagram of an exemplary preferred embodiment of a system that utilizes the invention for communication among associated subsystem apparatus and a host. The system 10 includes at least one primary apparatus having extensive resources relative to other system 10 components, such as processing and useable electronic memory. The primary apparatus is referred to herein as the host 12 for convenience. The host 12, a computer, or microprocessor, or microcontroller, for example, preferably provides support to a number of associated subsystem components, including relatively less sophisticated subsystem apparatus, such as for example, smart batteries 14, power supplies 16, $I^2C$ peripherals 18, power generation equipment 20, solenoid switches 22, and/or various other apparatus 24. A Multi-Management Controller (MMC) 26 is equipped with numerous communication buses, such as the SMBus 28, PMBus 30, $I^2C$ bus 32, and additional analog or digital busses 34, 36, 38 shown. The buses shown in FIG. 1 are shown by way of example and are not intended to limit the invention. Those skilled in the arts will recognize that buses may be provided at the MMC 26 of the invention in various combinations and arrangements and that the MMC 26 may be used to control any subset of buses. The MMC 26 preferably includes a single physical host bus 40 for communication between the MMC 26 and the host 12. The Multi-Management Protocol (MMP) 42 provides the communication infrastructure required for coordinating the functioning of the host 12 with the additional system components, e.g., 14, 16, 18, 20, 22, 24. Preferably using a single physical interface with the host, the MMC-to-host bus 40, and the use of a single protocol, the MMP 42, at the host 12, the invention simplifies the coordination of the components of the system 10 and simplifies the communication demands upon the host 12. Variations of the invention are possible wherein a system host and one or more subsystem apparatus are designed to operate using the Multi-Management Protocol (MMP), wherein protocol conversion at the Multi-Management Controller (MMC) is not required, and mutually exchanged MMP packets may simply pass through the MMC without alteration, or in some cases though direct host-to-subsystem buses. The MMC may be used to perform analog and digital conversion functions, as indicated, consistent with the needs of the application.

The MMP may be used for many different applications, such as for example, battery monitoring, power supply monitoring, switch activation, remote sensor monitoring, and so forth. Thus, using the invention makes a system amenable to addition, removal, or change among one or more of its subsystems with little effect on the host implementation. This increases the adaptability and utility of the host, as well as of the system overall. Another benefit of the use of the invention is abstraction. The host using the invention is not required to manage a plethora of different physical interfaces in order to accommodate each subsystem apparatus member of the system. This represents an improvement over the prior art, in which individual subsystems can sometimes require different physical interfaces, which may require modification of the system design in order to accommodate relatively minor variations in subsystems.

Figure 2:
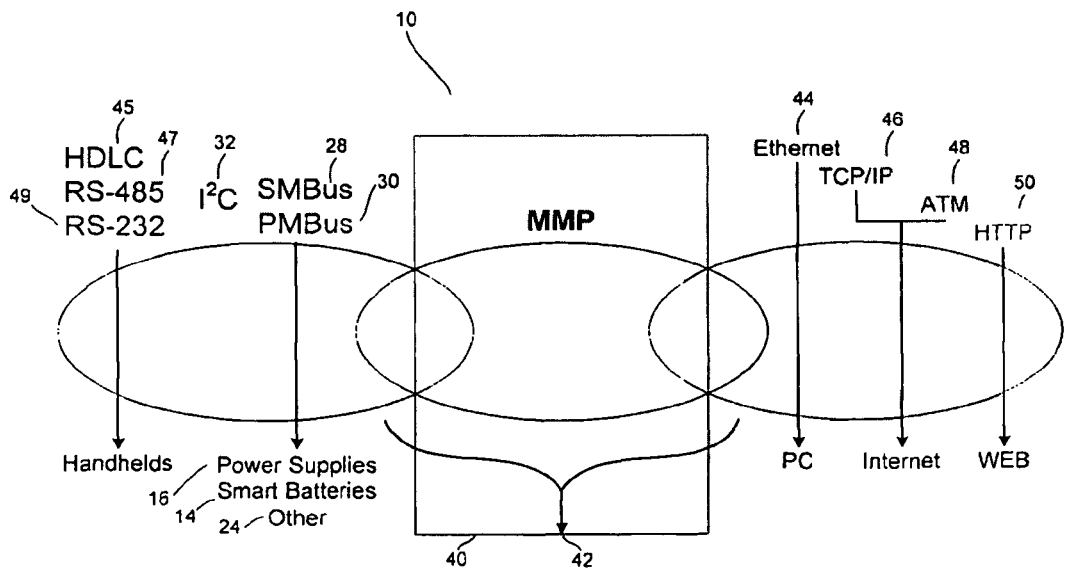
FIG. 2 is a conceptual view of the operation of the systems and methods of the invention within the context of systems and protocols known in the arts.

Now referring primarily to FIG. 2, a conceptual overview of the operation of the Multi-Management Protocol (MMP) 42 is provided in order to illustrate an exemplary context of a system having a spectrum of communication protocols and to show the functions that may be fulfilled by the MMC and MMP between any of the two protocols of different levels. Preferably, the system host 12, is equipped with various high-level protocols known in the arts. For example, high-level communications capabilities may be provided by Ethernet 44, TCP/IP 46, ATM 48, and HTTP 50 protocols. Using the Multi-Management Protocol (MMP) 42 of the invention, the high-level communication protocols (e.g., 44, 46, 48, 50) provide the system 10 with capabilities for using numerous subsystem components. The subsystem components, e.g., battery 14, power supply 16, and other electronic subsystem apparatus 24, may use various low-level protocols, such as, HDLC (High-level Data Link Control) 45, RS-485 47, RS-232 49, (I²C 32, SMBus 28, PMBus 30, known in the arts. For convenience, serial interface protocols based on the exemplary RS-232 model, e.g., RS-422, RS-423, RS-430, RS-485, etc. are referred to collectively herein as the "RS protocol family". Communication between the host 10 and the low-level subsystem apparatus (e.g., 14, 16, 24) is through the MMP 42. As shown in the example of FIG. 2, the invention provides an approach for efficiently facilitating communications between any given combination of standard low-level and high-level communication protocols.

Figure 3:
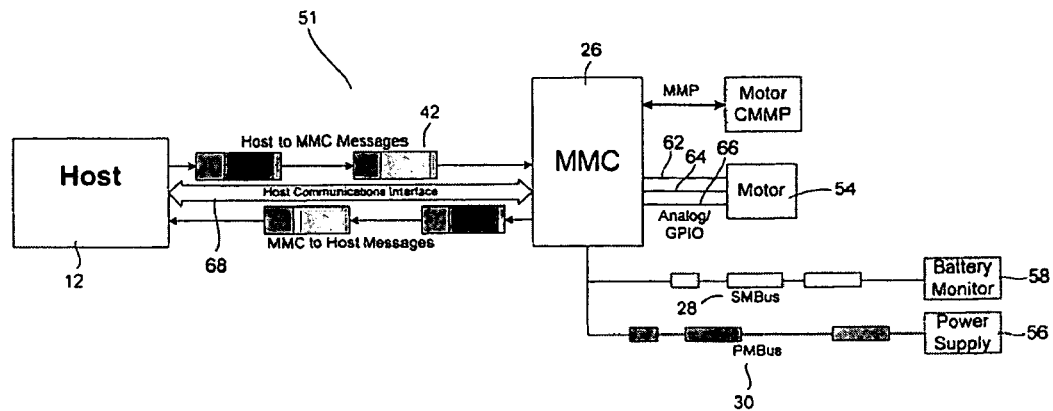
FIG. 3 is a schematic diagram of an example of a preferred embodiment of a system and method of the invention.

In a simplified view of an example of a preferred embodiment of the invention, FIG. 3 shows a system 51, which includes a host 12, such as a microprocessor for example, and subsystem components such as, a motor 54, a power supply 56, and a battery monitor 58. The system 51 also includes a Multi-Management Controller (MMC) 26. The MMC 26 in this example includes physical communication links 62, 64, 66, to the motor 54, power supply 56, and battery monitor 58, respectively. A single physical interface 68 links the host 12 with the MMC 26. In operation, the low-level system components, such as the power supply 56 and smart battery 58, use existing protocols, e.g., SMBus 28, PMBus 30, and I²C, typically used for communicating with and managing these components. The host-to-MMC interface 68, uses higher-level MMP 42 communication, preferably using protocol tunneling, further described below following descriptions of the MMP architecture and packet structure.

Figure 4:
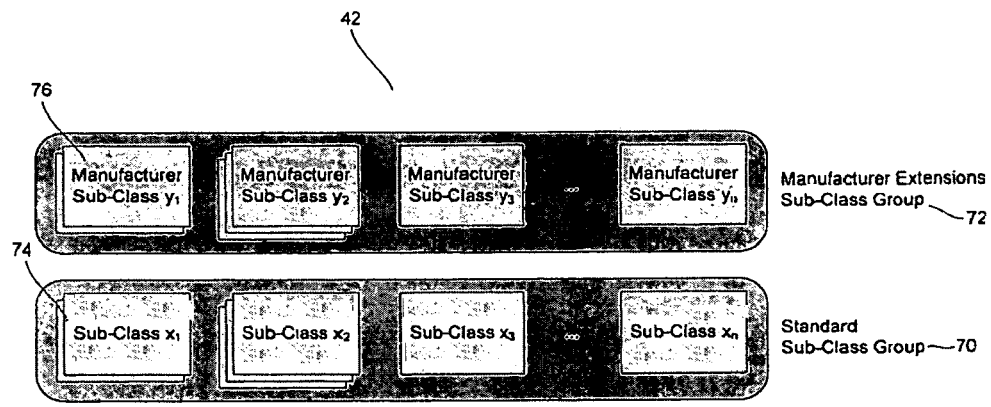
FIG. 4 is a conceptual view of an example of the protocol sub-classing organization according to preferred embodiments of the invention.

Preliminary to further description of the use of the invention, in FIG. 4, a diagram illustrating the MMP architecture is shown. In this conceptual view, the MMP 42 is shown with two subclass groups. A standard subclass group 70 includes functions provided as a foundation for potential use in every implementation. This standard subclass group 70 enables the client (the drivers on the system host 12, for example) to obtain information concerning the level of support each subsystem apparatus has, without a large number of queries. An additional subclass group, herein termed manufacturer extension subclass group 72, is also provided. Each of the subclass members, e.g., 74, 76, has a unique identifier, for example, values between 1 and 65535. The subclasses are in turn grouped together according to like functionality, e.g., X1, Y1, X2, Y2, X3, Y3 . . . Xn, Yn. For example, subclass X1 may contain functions that support DC motor control and configuration, and subclass Y1 may contain motor faults relating to a particular motor. Both the standard and manufacturer subclass groups 70, 72, are configured in this manner. Each subclass has one function that identifies the subsystem apparatus by an integer identifier, a version identifier, and an optional string identifier. Providing for each subsystem apparatus to have a version identifier is useful for updating protocol functions, and eases the potential implementation of host processor drivers and software supporting the MMP 42. Since each subclass has a version identifier, it is possible to modify, or replace, a given component of the MMP 42, without affecting the rest of the MMP 42 or the host driver implementation. The MMP 42 is designed to allow readily scalable implementation and the addition of extensions to it as the needs of the system served by the protocol evolve. Rather than a large monolithic protocol that is updated all at once, the MMP 42 allows subclasses of the protocol 74, 76 to be updated individually. This methodology increases system efficiency, providing the ability to update individual portions of the protocol, rather than the entire protocol. Additionally, the driver implementation on the system host 12 may preferably use the same model. It is believed that implementing protocol subclasses 74, 76 on a component-by-component basis reduces the overall programming effort and reduces the code footprint on the system host 12, making a processor-efficient implementation by using only the portions of the protocol that are required for a particular application.

The MMP 42 is designed to accommodate future extensibility, manufacturer extensions, and to enable its use over different types of interface. Accordingly, the packet structure of the MMP 42 has built-in flexibility adapted to meet these goals. Preferably, there are essentially three types of transactions that can be performed using the MMP 42. One type of transaction is, a request from the system host 12 (FIG. 1) to a target subsystem apparatus (14, 16, 18, 20, 22, 24). For example, this may be a request to write data, read data, or an announcement of a condition. All requests from system host 12 to target subsystem apparatus (14, 16, 18, 20, 22, 24) require a matching response from the target subsystem apparatus (14, 16, 18, 20, 22, 24) in order to ensure that the request has been processed. Another type of transaction in the MMP 42 is a command from a system host 12 to a target subsystem apparatus (14, 16, 18, 20, 22, 24) that does not require a response. An instruction to a target subsystem apparatus (14, 16, 18, 20, 22, 24) to power down, for example. The third type of transaction is an unsolicited message from a target subsystem apparatus (14, 16, 18, 20, 22, 24) to a system host 12, such as to announce a condition, without an initial request from the system host 12. The MMP data packet 80 (please see FIG. 5) is the same for all of these types of transactions.

Figure 5:
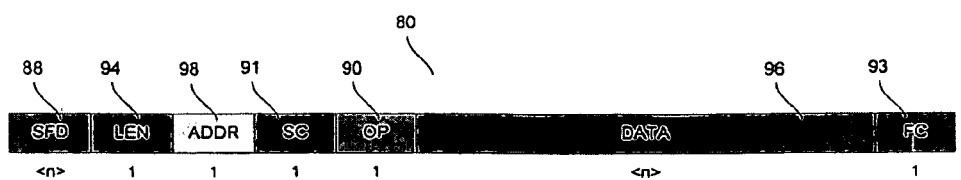
FIG. 5 is a conceptual view of an example of a preferred embodiment of the packet structure of a protocol implementing the invention.

As shown in FIG. 5, the preferred structure of the fields of an MMP data packet 80 includes a starting frame delimiter (SFD 88) token that any MMP peripheral, such as the MMC, may use to detect the beginning of a MMP data packet 80. The SFD 88 may be used in the event data corruption occurs to determine where the start of the next data packet is, so that the MMP peripheral may correctly parse it for the transactions that follow. The address (ADDR 98) field is the target address for the packet 80. This is preferably an eight-bit field and has a valid value within the range of 0-127. The values of 0 and 127 are preferably reserved for future use, such as for the support of broadcasted or general announcements for multinode physical layers, and the remaining values in this exemplary embodiment, 1-126, are used for addressing. Many low level protocols, such as RS-232, supported by the MMP do not include an address, therefore the ADDR field must always be present in the MMP data packet 80. In cases where the low level protocol does support addressing, such as SMBus the ADDR field 98 is simply ignored. This field is not necessarily the same as the device address in protocols that support multiple slaves (such as I²C). The address ADDR 98 can be thought of as a virtual address for point-to-point protocols. For example, in the system 51 shown in FIG. 3, each of the subsystem apparatus connected to the MMC 26 preferably has a different address represented by the ADDR field 98. In this diagram, the motor 54, power supply 56, and battery monitor 58, connected with the MMC 26 may be addressed through the MMC 26 by representing each with a unique address in the ADDR field 98 in the MMP data packet 80. There is no convention for the assignment of addresses for the ADDR field 98, which may be assigned by the user of the invention, as long as a given communications link using the invention is provided with unique addresses for all connected subsystem apparatus.

The subclass identifier (SC 91) defines the subclass for the given MMP data packet 80. This field is preferably an eight-bit identifier and instructs the target subsystem apparatus whether the packet includes a standard subclass group or manufacturer extension subclass group message. As an example, the range of subclass identifiers SC 91 is preferably split between standard and manufacturer extension messages as indicated by a particular application. For the purposes of this example, the division is made as follows: 0-31, Standard and reserved subclasses; 32-254, manufacturer extension subclasses; 255, reserved for potential future subclass expansion. It should be understood that other subclass groupings are possible without departure from the principles of invention.

The operation field (OP 90) defines the operation for the MMP data packet 80 within a given subclass SC 91. The OP 90 preferably has a set of assigned eight-bit values for each standard subclass. For manufacturer extension subclasses, the manufacturer may assign the operation fields OP 90 in any way, as long as they are limited to the appropriate number of bits, in this case an eight-bit number, and there are no duplicates within a given subclass SC 91. For standard subclasses, only standard defined operation identifiers OP 90 may be used.

The frame check field (FC 93) is a mechanism that can be used to determine MMP data packet 80 integrity. The frame check FC 93 is an eight-bit field that the receiving entity (e.g., system host 12 or target subsystem apparatus 14, 16, 18, 20, 22, 24, in FIG. 1) may use to validate the packet 80 integrity upon reception. The MMP 42 supports existing data integrity protocols such as, CRC-8, and eight-bit checksum. Not all protocol interfaces that the MMP 42 supports have a data integrity mechanism, for example $I^2C$ In such cases, the MMP 42 provides one (FC 93), improving the reliability of the system.

The length field (LEN 94) defines the length of the MMP data packet 80, from the ADDR field 98 up to and including the FC 93 field. The LEN 94 is preferably used in order to inform low-level drivers on the system host 12 and target subsystem apparatus (FIG. 1, e.g., 14, 16, 18, 20, 22, 24) exactly how many bytes remain in the MMP data packet 80, in order to ease buffer manipulation and FC 93 calculation and verification. The LEN 94 is used for delineating packets on the physical media along with the SFD 88. If the packet is physically longer or shorter than the LEN field 94 indicates, then the receiving entity may declare an error. Preferably, the LEN field may have a value of 0 to 255, in the present example, values from 0 to 24 may be used. It is possible for a packet to contain no DATA 96 payload. In these circumstances, the action to be taken is fully defined by the SC 91 and OP 90 fields, and the LEN field 94 verifies that no DATA 96 has been lost.

The data field (DATA 96) contains the portion of the MMP data packet 80 that is specific to the subclass SC 91 and operation OP 90. This DATA field 96 contains a variable length message, any available number of depending upon the system used. A simple example of how a write request and response could be written to a target device is shown and described with reference to FIGS. 6A and 6B below, demonstrating an example of the use of a data packet according to the invention using from 0 to 24 bytes.

Figure 6A:
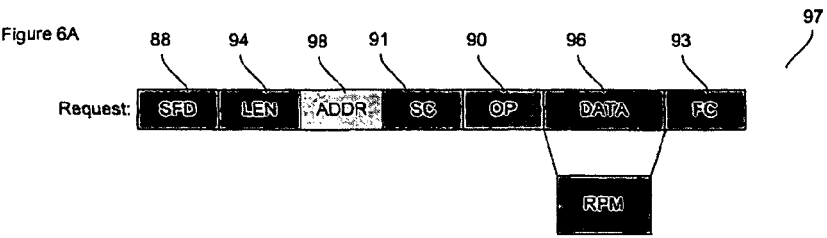
FIG. 6A is an illustration of an example of the use of the invention with the packet structure introduced with reference to FIG. 5.
Figure 6B:
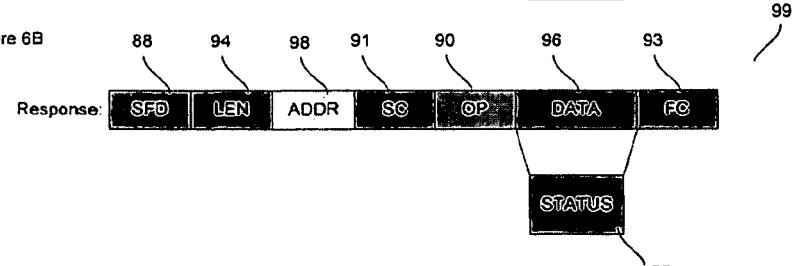
FIG. 6B is an illustration of the continuation of the example of the use of the invention of FIG. 6A.

The MMP data packet 80 does not contain sequence numbers, thus transactions between the system host 12 and target subsystem apparatus (FIG. 1; 14, 16, 18, 20, 22, 24) must be synchronous, unless the DATA 96 portion of the transaction supports its own ordering mechanism. In an example of the use of the invention, FIGS. 6A and 6B depict the use of an individual MMP data packet 80, in the format introduced in FIG. 5, operating within a simple system 51 as shown in FIG. 3. Beginning with FIG. 6A, for the sake of this example, a request data packet 97 is sent from the system host 12, requesting that a particular motor 54 be run at a specified speed (RPM). The DATA 96 field contains the RPM setting to be applied at the targeted motor 54. Assuming for the sake of the example, that this DATA 96 field is two bytes, then the request data packet 97 size is eight bytes as follows. A five-byte header includes the starting frame delimiter SFD 88, identifying the beginning of the request data packet 97. Also within the header, a length field LEN 94 indicates the length of the request data packet 97, in this example eight bytes. An address field ADDR 98 indicates the targeted motor 54 as the destination for the request data packet 97. The subclass identifier field SC 91 indicates that the request data packet 97 belongs to a particular subclass, in this example it is assumed that an RPM setting is a standard subclass 74 defined for the motor 54. In the operation identifier field OP 90, an operation is indicative of the request to increase or decrease the motor speed from its current value. The DATA 96 field contains the specific details of the RPM setting to be applied at the motor 54. Finally, the frame check field FC 93 validates the integrity of the packet and indicates to the motor 54 that the request data packet 97 is complete.

Now also referring to FIG. 6B, preferably the MMP 42 requires that each request have a matching response from the target entity in order to confirm that the request, in this case the request data packet 97 illustrated in FIG. 6A, has been processed properly. In this example, the response data packet 99 from the target motor 54 contains status data STATUS 92 in the DATA 96 field, indicating the result of the requested operation. As always, the response data packet 99 begins with the starting frame delimiter SFD 88 to mark the beginning of the response data packet 99. As in the previous request data packet 97 of FIG. 6A, the length of the packet is indicated by the length field LEN 94, and the intended recipient of the response data packet 9 is indicated by the address field ADDR 98, in this example, the particular location of the system host 12 originating the request data packet 97 of FIG. 6A. Preferably, the MMP 42 convention of requests and responses requires the response, in this case response data packet 99, to use the same subclass identifier SC 91 and operation identifier OP 90 as the request data packet 97, of FIG. 6A. In this example, to indicate to the system host 12 that this is the correct response, matching the request. Further information, such as status codes, in this case denominated STATUS 92, is included in the DATA 96 field of the response data packet 99. The frame check field FC 93 signals that the response data packet 99 is complete, verifying the integrity of the packet 99.

Figure 7:
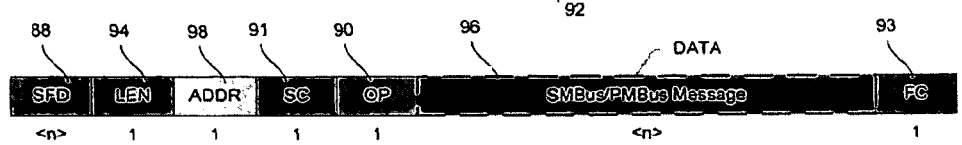
FIG. 7 is a conceptual view of protocol tunneling according to a preferred embodiment of the invention.

Referring again for context to the operation of a physical system as portrayed in the example of the system 51 of FIG. 3, MMP 26 tunneling is further explained with reference to the illustration of FIG. 7. Tunneling is a mechanism by which a protocol can be encapsulated and transmitted within another protocol in order to leverage existing support through new communications interfaces. According to the invention, the MMP 10 may be used to tunnel existing protocol messages, such as SMBus 28, and PMBus 30, for example, within MMP data packets 80 so that they can be used to manage remotely connected subsystem apparatus, in this example, a power supply 56 and smart battery 58 (FIG. 3). Within the context of the system 51 of FIG. 3, it can be seen in this example that the system host 12 encapsulates the SMBus 28 and/or PMBus 30 messages as follows. The MMP encapsulates the SMBus 28 or PMBus 30 messages in the DATA 96 field of the MMP data packet 80. Specific subclass SC 91 and operation identifiers (OP 90) allow the MMC 26 (FIG. 3) to recognize whether the data field DATA 96 in the MMP data packet 96 is a tunneled SMBus 28 or PMBus 30 message. Recognizing that the DATA 96 is a tunneled message, the MMC 26 de-encapsulates the SMBus 28 and/or PMBus 30 messages and uses the existing interfaces at the MMC 26 and the appropriate protocols, in this example SMBus 28 or PMBus 30, to send the tunneled message DATA 96 downstream to the power supply 56 and/or smart battery 58. Thus, the invention allows a system host 12 to use a single communications interface 68 with the MMC 26 to manage attached subsystem apparatus, e.g., 54, 56, 58.

It should be appreciated by those skilled in the arts that the MMC 26 can receive SMBus 28 and PMBus 30 messages from the subsystem apparatus, e.g., the power supply 56 or battery 58, for transmittal to the system host 12 as well. The MMC 26 in turn encapsulates them and sends them as DATA 96 in the appropriate MMP to the system host 12. Using the invention, the MMC 26 performs considerable control over the subsystem apparatus, with minimized involvement by the system host 12. That is, the MMC 26 preferably manages the subsystem apparatus directly insofar as practical. From the point of view at the system host 12 used in implementing the invention, the MMP 10 provides a native, homogenous protocol solution to the diverse needs of the subsystem apparatus. The MMP 10 uses its subclass architecture to extend its support of system apparatus, and presents an efficient, economical interface to the host.

Referring to the examples of preferred embodiments of the invention shown and described herein, it should be appreciated by those skilled in the arts that the MMP 10 communications functions are preferably performed in a single MMC 26 integrated circuit. The MMP 10 methods and systems of the invention use a subclassing by which protocol messages are grouped together with a subclass identifier and a range of operation codes for each subclass. The subclassing architecture functionally organizes the MMP 10 to allow for standardization of subclasses. Subclassing also provides a mechanism for individual users to add support to the MMP 10 for their particular needs, while leaving its basic architecture in tact. It is also preferred that MMP 10 implementations include support for a dynamic detection feature. In electronic systems that use low-level protocols for communications with apparatus within the system, the system host 12 has a priori knowledge of the apparatus of system. The system host 12 must know how many subsystems exist and also must know the communications mechanism for each of them, which can vary even if using the same physical interface. According to the invention, the MMP 10 contains facilities for the host to query the MMC 26, via the MMP 10, to identify the subsystems present. For example, again referring to FIG. 3, when the MMC 26s queried by the system host 12, it dynamically notifies the system host 12 that there are subsystems present, in this example, a motor 54, a power supply 56, and smart battery 58. The dynamic subsystem detection capability of the invention is advantageous in terms of system adaptability and efficiency. In the event subsystems are removed or added, the system host 12 is notified dynamically.

The MMC 26 is preferably implemented as a self-contained hardware bridge in the MMP 12 communication topology between the system host 12 and its subsystem apparatus. The MMC 26 includes the logic necessary to facilitate the mapping between the Host Communications Interface 68 and the connected electronic subsystems and their buses. The use of the MMC 26 simplifies the necessary hardware requirements of the system host 12 by removing the need to support the various low-level protocols that the connected electronic subsystems may require. In addition, the MMC 26 preferably also includes the necessary logic to perform some of the communication processing without involving the system host 12. This provides the advantage of raising the level of abstraction of the Host Communications Interface 68 with the connected electronic subsystems. The techniques of the invention preferably reduce the control interface between the host processor and the electronic subsystems single interface using lower-level protocols to a single host-to-MMC interface. As indicated herein, variations of the invention are possible in which a host and subsystem apparatus communicate directly host-to-subsystem MMP buses.

The methods and systems of the invention provide electronic systems with one or more useful advantages, including but not limited to improved efficiency by providing a scalable communication protocol approach for coordinating among applications that use high-level protocols and resource-limited subsystems that use low-level protocols, using a fraction of the processing and memory resources required for high-level protocols. The increases in system development efficiency and operational efficiency realized using the invention also lead to reduced costs. While the invention has been described with reference to certain illustrative embodiments and particular advantages, those described herein are not intended to be construed in a limiting sense. For example, variations or combinations of steps or apparatus in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. In a multi-component electronic system, a protocol method comprising:

providing a single bus for coupling a system host to a plurality of system components; and, providing a Multi-Management Protocol operable at the bus, wherein the Multi-Management Protocol further comprises;

a plurality of subclasses, each subclass comprising unique identifier data comprising integer values ranging from 0 to 65535 for storing component identity information, each subclass also comprising component version information and function data for storing at least one programmable function;

wherein the plurality of subclasses are grouped by functionality into at least two groups comprising a standard group and an extension group; and further comprising steps for modifying one or more subclass independently from one or more additional subclasses.

2. In a multi-component electronic system, an electronic protocol packet structure comprising:

a starting frame delimiter for identifying the beginning of a packet;

a length field indicative of the length of the packet;

an address field indicative of a target address for the packet;

a subclass identifier defining the subclass of the packet as belonging to one or more groups, further comprising at least a standard group and an extension group;

an operation identifier defining the packet origin and one or more targeted recipient;

a data field comprising of a variable number of bytes of data specific to the packet subclass and operation;

a frame check field configurable for packet integrity verification.

3. The electronic protocol packet structure according to claim 2 wherein the operation identifier defines the packet as consisting of a message selected from the following group: host-to-target request; host-to-target command; target-to-host alert.

4. The electronic protocol packet structure according to claim 2 wherein the data field further comprises a message in a common protocol format.

5. The electronic protocol packet structure according to claim 2 wherein the data field further comprises a message in a SMBus protocol format.

6. The electronic protocol packet structure according to claim 2 wherein the data field further comprises a message in a PMBus protocol format.

7. The electronic protocol packet structure according to claim 2 wherein the data field further comprises a message in an RS protocol family format.

8. The electronic protocol packet structure according to claim 2 wherein the data field further comprises a message in an I²C protocol format.

9. A protocol conversion apparatus, comprising:
a Multi-Management Controller (MMC) using a host bus for transmitting and receiving data between a host and the MMC based on a Multi-Management Protocol; wherein
the MMC is adapted for transmitting and receiving data supporting a plurality of subclasses using the host bus for transmitting and receiving data packets between the MMC and the host, and a plurality of communications buses for transmitting and receiving data packets between the MMC and a plurality of subsystem apparatus.

10. The protocol conversion apparatus according to claim 9 wherein the MMC further comprises a digital to analog converter.

11. The protocol conversion apparatus according to claim 9 wherein the MMC further comprises an analog to digital converter.

12. The protocol conversion apparatus according to claim 9 wherein the MMC is adapted for processing Multi-Management Protocol data packets received from the host communication bus and generating one or more corresponding subclass data packets in the form of a selected protocol for transmittal to one or more of the subclass buses; and wherein,
the MMC is adapted for processing data packets comprising one or more selected protocols received from the subclass communication buses and generating one or more corresponding Multi-Management Protocol data packets for transmittal to the host communication bus.

13. The protocol conversion apparatus according to claim 9 wherein the MMC is adapted for processing Multi-Management Protocol data packets received from the host communication bus and generating one or more corresponding subclass data packets in the form of a PMBus protocol for transmittal to one or more of the subclass buses; and wherein,
the MMC is adapted for processing data packets comprising PMBus protocol received from the subclass communication buses and generating one or more corresponding Multi-Management Protocol data packets for transmittal to the host communication bus.

14. The protocol conversion apparatus according to claim 9 wherein the MMC is adapted for processing Multi-Management Protocol data packets received from the host communication bus and generating one or more corresponding subclass data packets in the form of a SMBus protocol for transmittal to one or more of the subclass buses; and wherein,
the MMC is adapted for processing data packets comprising SMBus protocol received from the subclass communication buses and generating one or more corresponding Multi-Management Protocol data packets for transmittal to the host communication bus.

15. The protocol conversion apparatus according to claim 9 wherein the MMC is adapted for processing Multi-Management Protocol data packets received from the host communication bus and generating one or more corresponding subclass data packets in the form of a I²C protocol for transmittal to one or more of the subclass buses; and wherein,
the MMC is adapted for processing data packets comprising I²C protocol received from the subclass communication buses and generating one or more corresponding Multi-Management Protocol data packets for transmittal to the host communication bus.

16. The protocol conversion apparatus according to claim 9 wherein the MMC is adapted for processing Multi-Management Protocol data packets received from the host communication bus and generating one or more corresponding subclass data packets in the format of an RS protocol family for transmittal to one or more of the subclass buses; and wherein,
the MMC is adapted for processing data packets comprising RS protocol family format received from the subclass communication buses and generating one or more corresponding Multi-Management Protocol data packets for transmittal to the host communication bus.

* * * * *